US008744268B2

(12) United States Patent
Lou et al.

(10) Patent No.: US 8,744,268 B2
(45) Date of Patent: Jun. 3, 2014

(54) PASSIVE OPTICAL NETWORK MODULE

(75) Inventors: Xiaoming Lou, Arcadia, CA (US); Genzao Zhang, Ottawa (CA); Eric Hufstedler, Pasadena, CA (US); Leonel Gomez, Burbank, CA (US); Eva Peral, Altodena, CA (US)

(73) Assignee: Emcore Corporation, Albuquerque, NM (US)

( * ) Notice: Subject to any disclaimer, the term of this patent is extended or adjusted under 35 U.S.C. 154(b) by 229 days.

(21) Appl. No.: 12/045,541

(22) Filed: Mar. 10, 2008

(65) Prior Publication Data

US 2012/0183289 A1 Jul. 19, 2012

(51) Int. Cl.
*H04B 10/00* (2013.01)
*H04J 14/08* (2006.01)

(52) U.S. Cl.
USPC ............... 398/138; 398/66; 398/68; 398/98; 398/99; 398/101

(58) Field of Classification Search
CPC ............... H04B 10/2575; H04B 10/25751; H04B 10/25753; H04B 10/25759
USPC ........................................................ 398/138
See application file for complete search history.

(56) References Cited

U.S. PATENT DOCUMENTS

| 5,524,285 | A | 6/1996 | Wray et al. |
| 6,313,459 | B1 | 11/2001 | Hoffe et al. |
| 6,658,217 | B2 | 12/2003 | Ohhata et al. |
| 7,038,910 | B1 | 5/2006 | Hodge et al. |
| 7,142,740 | B2 | 11/2006 | Lee et al. |
| 7,217,914 | B2 | 5/2007 | Stewart et al. |
| D592,137 | S * | 5/2009 | Weitz ............ D13/123 |
| 7,792,434 | B2 | 9/2010 | Ichino |
| 7,855,867 | B2 | 12/2010 | Lou et al. |
| 2003/0068140 | A1* | 4/2003 | Brezina et al. ......... 385/92 |
| 2003/0197559 | A1* | 10/2003 | Ghannouchi et al. ...... 330/149 |
| 2004/0264964 | A1* | 12/2004 | BuAbbud ............... 398/72 |
| 2006/0067705 | A1* | 3/2006 | Paulsen ............... 398/164 |
| 2007/0133989 | A1 | 6/2007 | Kim et al. |
| 2007/0134003 | A1* | 6/2007 | Lee et al. ............. 398/164 |
| 2008/0193140 | A1* | 8/2008 | Liu et al. ............. 398/135 |
| 2008/0238809 | A1* | 10/2008 | Mtchedlishvili et al. ..... 343/906 |
| 2008/0267621 | A1* | 10/2008 | Sheth et al. ............. 398/25 |
| 2009/0080888 | A1 | 3/2009 | Sugawara et al. |

OTHER PUBLICATIONS

Faulkner, et al., "Adaptive Linearisation Using Pre-Distortion", 1990 IEEE, CH2846-4/90/0000-0035, pp. 35-40.

* cited by examiner

*Primary Examiner* — Daniel Dobson

(57) ABSTRACT

A GPON module comprises a housing and a circuit board disposed in the housing. The circuit board further includes ground lines that substantially isolate regions of the circuit board, an electro-optical interface for converting an inbound optical signal to an electrical signal and processing circuitry that is arranged to provide an electrical RF signal to an RF interface. The RF interface comprises a three-pin RF connector exposed from the housing, wherein the RF connector is coupled directly to the circuit board, and two of the three pins are coupled to ground.

26 Claims, 15 Drawing Sheets

PASSIVE OPTICAL NETWORK MODULE

CROSS-REFERENCE TO RELATED APPLICATIONS

The disclosure of this application is related to co-pending U.S. Application Serial No. 29/302,489, filed on Jan. 18, 2008.

TECHNICAL FIELD

This disclosure relates to a passive optical network module.

BACKGROUND

Fiber optic technology has been recognized for its high bandwidth capacity over longer distances, enhanced overall network reliability and service quality. Fiber to the premises ("FTTP"), as opposed to fiber to the node ("FTTN") or fiber to the curb ("FTTC") delivery, enables service providers to deliver substantial bandwidth and a wide range of applications directly to business and residential subscribers. For example, FTTP can accommodate the so-called "triple-play" bundle of services, e.g., high-speed Internet access and networking, multiple telephone lines and high-definition and interactive video applications.

Utilizing FTTP, however, involves equipping each subscriber premises with the ability to receive an optical signal and convert it into a signal compatible with pre-existing wiring in the premises (e.g., twisted pair and coaxial). For bi-directional communication with the network, the premises should be equipped with the ability to convert outbound signals into optical signals. In some cases, these abilities are implemented with a passive optical network ("PON"), with each premises having a dedicated optical network unit ("ONU") for transceiving optical and electrical signals. In some instances, the ONU for a given subscriber is mounted outdoors.

Generally speaking, a PON is a point-to-multipoint fiber to the premises network architecture in which unpowered optical splitters are used to enable a single optical fiber to serve multiple (e.g., 32) premises. A PON can include an optical line termination ("OLT") at the service provider's central office and a PON module for each end user. Some currently implemented PONs employ the ITU-T G.983 standard, sometimes called "BPON" or "broadband PON." BPON includes support for wavelength division multiplexing, dynamic and higher upstream bandwidth allocation, and survivability. It also includes a standard management interface, called OMCI, between the OLT and PON module, enabling mixed-vendor networks. BPON supports bit rates of about 622 Mbits/second downstream and about 155 Mbits/second upstream. The next generation standard is ITU-T G.984, sometimes called "GPON" or "gigabit PON." Compared to BPON, GPON supports higher rates (2,488 Mbits/second downstream and 1,244 Mbits/second upstream), enhanced security, and choice of Layer 2 protocol (e.g., ATM, GEM, Ethernet).

Certain electro-optical transceiving functions are performed by a PON module (or "transceiver module") that is disposed inside the ONU. The PON module will vary with the type of PON with which it is associated (e.g., BPON module, GPON module, etc.). In some cases, the module includes a bulk optic WDM module that separates the wavelengths of the incoming optical signal. Each of the wavelengths is then manipulated accordingly. The continuous downstream data (e.g., 1490 nm) is filtered and amplified by a limiter amplifier IC. The burst upstream data originating from the premises is converted to an optical signal (e.g., at 1310 nm) and is controlled by a burst mode laser driver IC. This IC, along with other control circuitry, controls the laser to meet the requirements of the protocol (e.g., depending on whether the network is BPON or GPON).

The downstream video broadcast streams (e.g., 1550 nm) are manipulated by video receiver circuitry which transmits them through the premises via a 75-ohm coaxial cable. Normally, the interface for connecting the PON module to the coaxial cable consists of an interface cable extending from a circuit board within the PON module housing and coupling to a second circuit board at the subscriber location (e.g., within the ONU). This interface cable is expensive and complicates manufacturing and installation (due, e.g., to its bulk and inflexibility). Also, the large, inflexible and heavy interface cable may place excessive strain on the PON circuit board during transport, installation and use. The strain can be focused at the point at which the interface is coupled (e.g., soldered) to the PON circuit board, which may result in failure of the coupling.

SUMMARY

In an aspect of the invention, a GPON module comprises a housing and a circuit board disposed in the housing. The circuit board further includes ground lines that substantially isolate regions of the circuit board, an electro-optical interface for converting an inbound optical signal to an electrical signal and processing circuitry that is arranged to provide an electrical RF signal to an RF interface. The RF interface comprises a three-pin RF connector exposed from the housing, wherein the RF connector is coupled directly to the circuit board, and two of the three pins are coupled to ground.

The details of one or more implementations are set forth in the accompanying drawings and the description below. Other features and advantages will be apparent from the description and drawings, and from the claims.

DETAILED DESCRIPTION

The following is a disclosure of preferred implementations, as well as some alternative implementations, of a GPON module.

I. Network Architecture

Figure 1:
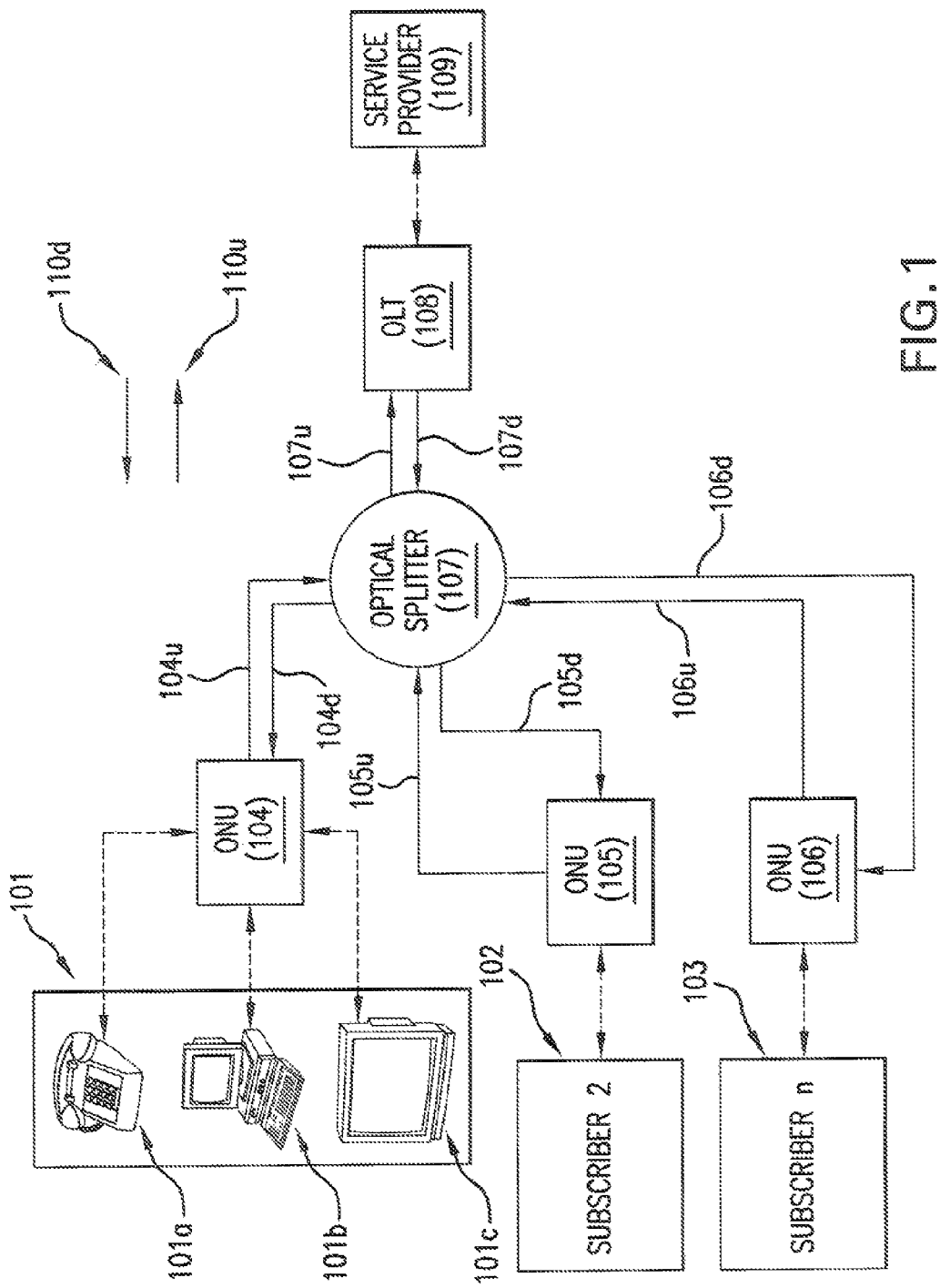
FIG. 1 is a block diagram illustrating an implementation of a PON (e.g., GPON) network architecture.

FIG. 1 illustrates an implementation of a network topology associated with a passive optical network, e.g., a GPON. Data transmission in the direction of arrow 110*d* will be referred to as "downstream" and data transmission in the direction of arrow 110*u* will be referred to as "upstream." Solid lines represent data exchange via an optical link (e.g., one or more fiber optic cables or fibers) and dotted lines represent data exchange via a non-optical link (e.g., one or more copper or other electrically conductive cables). Data transmission via optical links can be bi-directional, even over single fibers. Accordingly, in some implementations, subscribers (e.g., 101-103) receive and transmit data over a single fiber optic cable.

Service provider 109 provides one or more data services to a group of subscribers (e.g., 101-103). In some cases, the data services include, for example, television, telephone (e.g., voice over IP or "voIP") and internet connectivity. In some implementations, television services are interactive to accommodate features such as "on-demand" viewing of content. The service provider 109 may generate some or all of the content that the subscribers receive, or it may receive some or all of the content from third parties via a data link. For example, the service provider 109 can provide internet connectivity by coupling to the internet via a gigabit Ethernet connection or E1 or T1 connection(s). Also, the service provider 109 may couple to the PSTN for telephone service, e.g., via E1 or T1 connection(s). The service provider 109 can receive certain television content, e.g., via satellite. Television content can include additional data that is generated or provided by the service provider 109, e.g., data regarding programming schedules.

The service provider 109, as part of providing data services to a group of subscribers, can be adapted to receive data from subscribers. For television services, the service provider 109 receives data from subscribers indicative of, e.g., purchases and/or selection of "on-demand" type material or changes to subscription parameters (e.g., adding or deleting certain services). For telephone and internet services, the service provider 109 receives data originating from subscribers, thereby enabling bi-directional communication.

The service provider 109 is adapted to provide the data services content (e.g., bi-directional telephone, television and internet content) via a non-optical link to an optical line termination unit ("OLT") 108. The link between OLT 108 and service provider 109 can consist of one or more copper or other electrically conductive cables. The OLT 108 is adapted to receive data from the service provider 109 in one format (e.g., electrical) and convert to an optical format. The OLT 108 is further adapted to receive data from subscribers (e.g., 101-103) in an optical format and convert it to another format (e.g., electrical) for transmission to the service provider 109. In this implementation, the OLT 108 may be analogized to an electro-optical transceiver that: (1) receives upstream data in an optical format from subscribers (e.g., 107*u*), (2) transmits downstream data in an optical format to subscribers (e.g., 107*d*), (3) transmits the upstream data in electrical format to the service provider 109 and (4) receives the downstream data from the service provider in an electrical format.

To transmit the various data from the service provider 109 (e.g., telephone, television and internet) on as few optical fibers as possible, the OLT 108 performs multiplexing. In some implementations, the OLT 108 generates two or more optical signals representative of the data from the service provider 109. Each signal has a different wavelength (e.g., 1490 nm for continuous downstream data and 1550 nm for continuous downstream video) and is transmitted along a single fiber. This technique is sometimes referred to as "wavelength division multiplexing." Also, as certain data from the service provider 109 may be destined for only a particular subscriber (e.g., downstream voice data for a particular subscriber's telephone call, the downstream data for a particular subscriber's interne connection or the particular "on demand" video content requested by a particular subscriber), some implementations of the OLT 108 employ time division multiplexing ("TDM"). TDM allows the service provider 109 to target content delivery to a particular subscriber (e.g., to one or all of 101-103).

The OLT 108 is coupled to an optical splitter 107 via an optical link. The link can consist of a single optical fiber through which the OLT 108 transmits and receives optical signals (e.g., 107*d* and 107*u*, respectively). The optical splitter 107 splits the incoming optical signal (107*d*) from the OLT 108 into multiple, substantially identical copies of the original incoming optical signal (e.g., 104*d*, 105*d*, 106*d*). Depending on the implementation, each optical splitter 107 splits the incoming optical signal into 16 or more (e.g., 32 or 64) substantially identical copies. In an implementation that splits the incoming optical signal into 16 substantially identical copies, there are a maximum of 16 subscribers. Generally speaking, the number of subscribers associated with a given optical splitter is equal to or less than the number of substantially identical copies of the incoming optical signal.

In a GPON (i.e., a network compliant with ITU-T G.984), each downstream optical signal (107*d*) supports a downstream bandwidth of about 2,488 Mbits/second and each upstream signal (107*u*) supports an upstream bandwidth of about 1,244 Mbits/second.

In this implementation, the splitting is done in a passive manner (i.e., no active electronics are associated with the optical splitter 107). Each of the signals from the optical splitter 107 (e.g., 104*d*, 105*d*, 106*d*) is sent to a subscriber (e.g., 101-103, respectively) via an optical link.

Also, the optical splitter 107 receives data from subscribers via optical links. The optical splitter 107 combines (e.g., multiplexes) the optical signals (104*u*, 105*u*, 106*u*) from the multiple optical links into a single upstream optical signal (107*u*) that is transmitted to the OLT 108. In some implementations, each subscriber is equipped with an ONU that employs time division multiple access (TDMA). This allows the service provider 109, with appropriate demultiplexing, to identify the subscriber from whom each packet of data originated.

In some implementations, upstream and downstream data between a subscriber (e.g., one of 101-103) and the optical splitter 107 is transmitted bi-directionally over a single fiber optic cable.

The optical splitter 108 typically is disposed in a location remote from the service provider. For example, in a PON implemented for subscribers in a residential area, a given neighborhood will have an associated optical splitter 107 that is coupled, via the OLT 108, to the service provider 109. In a given PON, there can be many optical splitters 107, each coupled to an OLT 108 via an optical link. Multiple optical splitters 107 can be coupled to a single OLT 108. Some implementations employ more than one OLT and/or service provider.

The optical splitter 107 provides the substantially identical downstream signals (104*d*, 105*d*, 106*d*) to optical network units (104, 105, 106, respectively) associated with subscribers (101, 102, 103, respectively). In some implementations, each respective PON module is disposed in the vicinity of the subscriber's location. For example, an ONU may be disposed outside a subscriber's home (e.g., near other utility connections).

In the context of the network architecture, each ONU operates in a substantially identical fashion. Accordingly, only the functionality of ONU 104 will be discussed in detail.

ONU 104 receives the downstream signal 104*d* and demultiplexes it into its constituent optical signals. These constituent optical signals are converted to corresponding electrical signals (according to a protocol) and transmitted via electrical links to the appropriate hardware. In some implementations, electrical signals are generated that correspond to telephone (voIP), data/internet and television service. For example, electrical signals corresponding to telephone service are coupled to traditional telephone wiring at the subscriber's location, which ultimately connects with the subscriber's phone 101*a*. Data/internet services (e.g., for a PC 101*b*) also may be provided via traditional telephone wiring. Television signals (e.g., for a cable-compatible television 101*c*) are converted to appropriate RF signals and transmitted on coaxial cable installed at a subscriber's location.

As telephone, internet/data and television services all can be bi-directional, the ONU also receives electrical signals that correspond to data originating from the subscriber location. This upstream data is converted to an optical signal 104*u* by the ONU 104 (according to a protocol) and transmitted to the optical splitter 107. The optical splitter 107 combines optical signal 104*u* with the optical signals from other ONUs (e.g., 105*u* and 106*u*) for transmittal to the OLT 108 (as signal 107*u*).

II. Implementations of a PON Module

Generally speaking, an ONU includes a PON module that (1) receives a multiplexed optical signal from an optical splitter and demultiplexes it into two or more distinct optical signals that are converted into respective electrical signals and (2) receives distinct electrical signals that are converted into respective optical signals which are multiplexed for transmission. In PON modules used in connection with GPONs, the transmission and receipt of optical signals is governed by an ITU-T G.984-compliant protocol.

The electrical signals are commonly associated with implementing services for the subscriber, e.g., data/Internet, telephone and television. To maintain signal integrity, it is desirable to keep crosstalk between the incoming video, incoming data and outgoing data signals to a minimum. This is becoming increasingly difficult given the miniaturization of the PON module and the high-frequency characteristics of the electrical signals. Also, given that ONUs are often mounted outdoors, it is desirable to maintain signal integrity regardless of ambient temperature.

Figure 2:
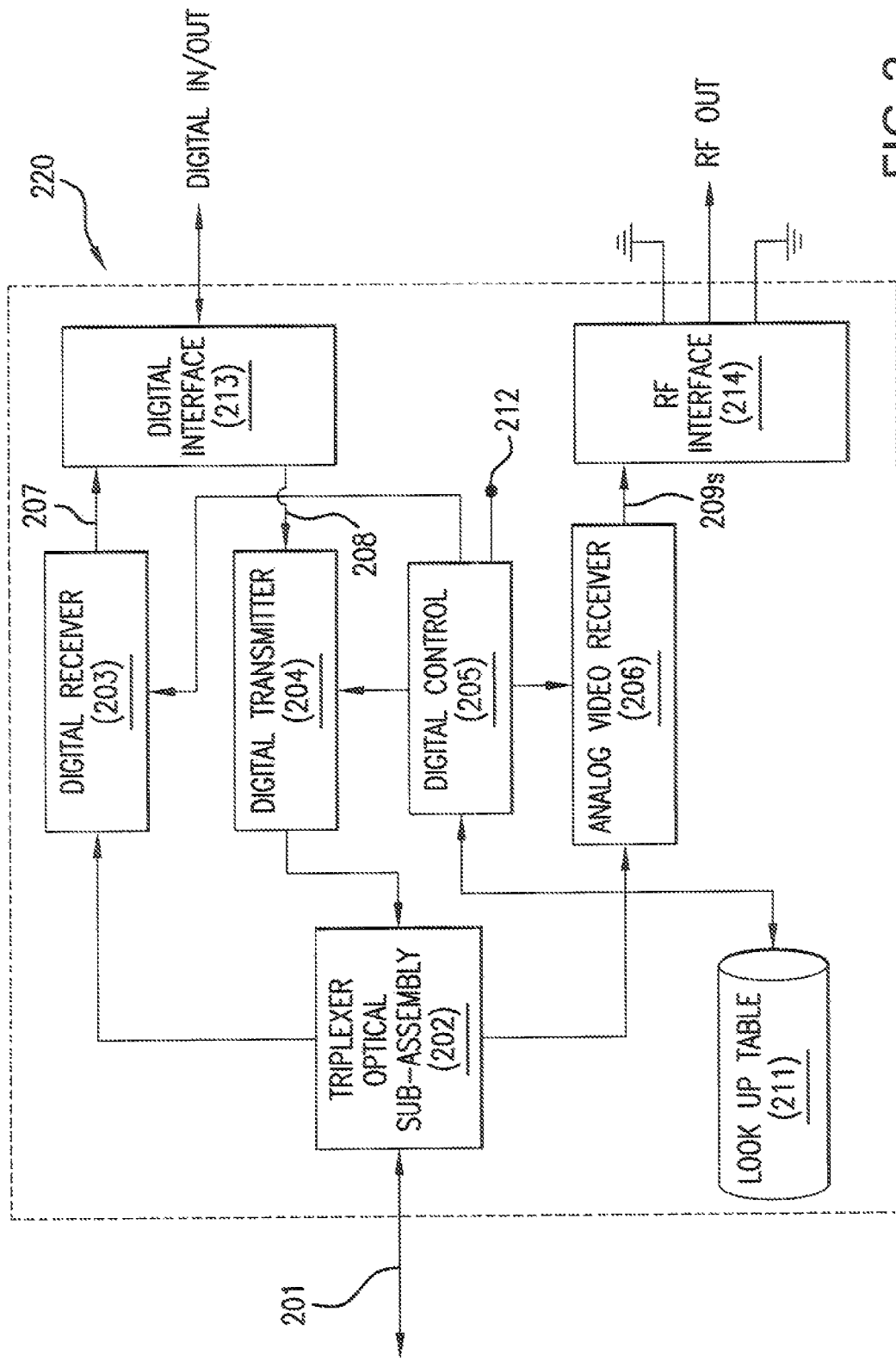
FIG. 2 is a block diagram of an implementation of a transceiver module.

FIG. 2 illustrates a schematic of an implementation of a GPON module 220 that is disposed inside an ONU (e.g., item 104 of FIG. 1). The module 220 comprises a triplexer optical sub-assembly 202 which is coupled to optical fiber 201. The optical fiber 201 carries an upstream optical signal (e.g., item 104*u* of FIG. 1) from the optical splitter (e.g., item 107 of FIG. 1) and carries a downstream optical signal (e.g., item 104*d* of FIG. 1) to the optical splitter. Optical fiber 201 can couple to several additional optical fibers before ultimately reaching an optical splitter. The triplexer 202 can take the form of a packaged electro-optical transceiver, and comprises one optical input/output port (coupled to optical fiber 201), two electrical outputs (one for data and one for video) and one electrical input (for upstream data).

In the illustrated implementation, the triplexer demultiplexes the downstream optical signal into two constituent optical signals. The constituent optical signals are converted into electrical signals, e.g., by photodiodes. The electrical signal corresponding to downstream data (e.g., from the 1490 nm optical signal) is transmitted to a digital receiver 203. The digital receiver 203, under control of digital control 205, provides an electrical data output signal 207. The digital control 205 ensures that the electrical signal 207 properly corresponds to the 1490 nm downstream optical signal according to one or more protocols. For example, in a gigabit PON (GPON), the digital control 205 ensures that all upstream and downstream data is processed substantially in compliance with ITU-T G.984. The electrical data output signal 207 is coupled to a digital interface 213. The digital interface 213 is coupled to wiring in the subscriber's premises (e.g., via an adapter or other interface), and provides downstream data for telephone and data (e.g., via twisted-pair lines). The digital interface 213 also can transmit and receive data to/from televisions or set-top boxes (e.g., in connection with "on demand" programming).

The electrical signal corresponding to downstream video (e.g., from the 1550 nm optical signal) is transmitted to an analog video receiver 206, which comprises an amplifier. Under control of digital control 205, the analog video receiver generates (and subsequently amplifies) an RF electrical signal 209*s*. The RF electrical signal 209*s* is coupled to an RF interface 214. The RF interface 214 is coupled via an adapter or other interface (not shown) to television wiring in the subscriber's premises (e.g., coaxial cable). The RF interface 214 includes three terminals: two grounds and one signal. This arrangement for the RF interface is discussed in more detail below.

Because television content may involve generating and receiving data aside from video content from analog video receiver 206 (e.g., in connection with ordering "on demand" content), the television wiring also may be coupled to the digital interface 213.

The triplexer 202 also generates an upstream, optical signal representative of data originating from the subscriber (e.g., signal 104*u* of FIG. 1). The digital interface 213 receives data (in an electrical format) originating from, e.g., telephones, computers and set-top boxes associated with the subscriber. This received data (208) is sent to the digital transmitter 204. The digital transmitter 204, under control of digital control 205, converts the data into a format appropriate for triplexer 202 to convert to an optical signal that is transmitted on fiber 201. The digital control ensures that the data is converted according to a predetermined protocol(s).

The look up table 211 and temperature sensor 212 are discussed below in the section entitled "Linearity Optimization."

Figure 3:
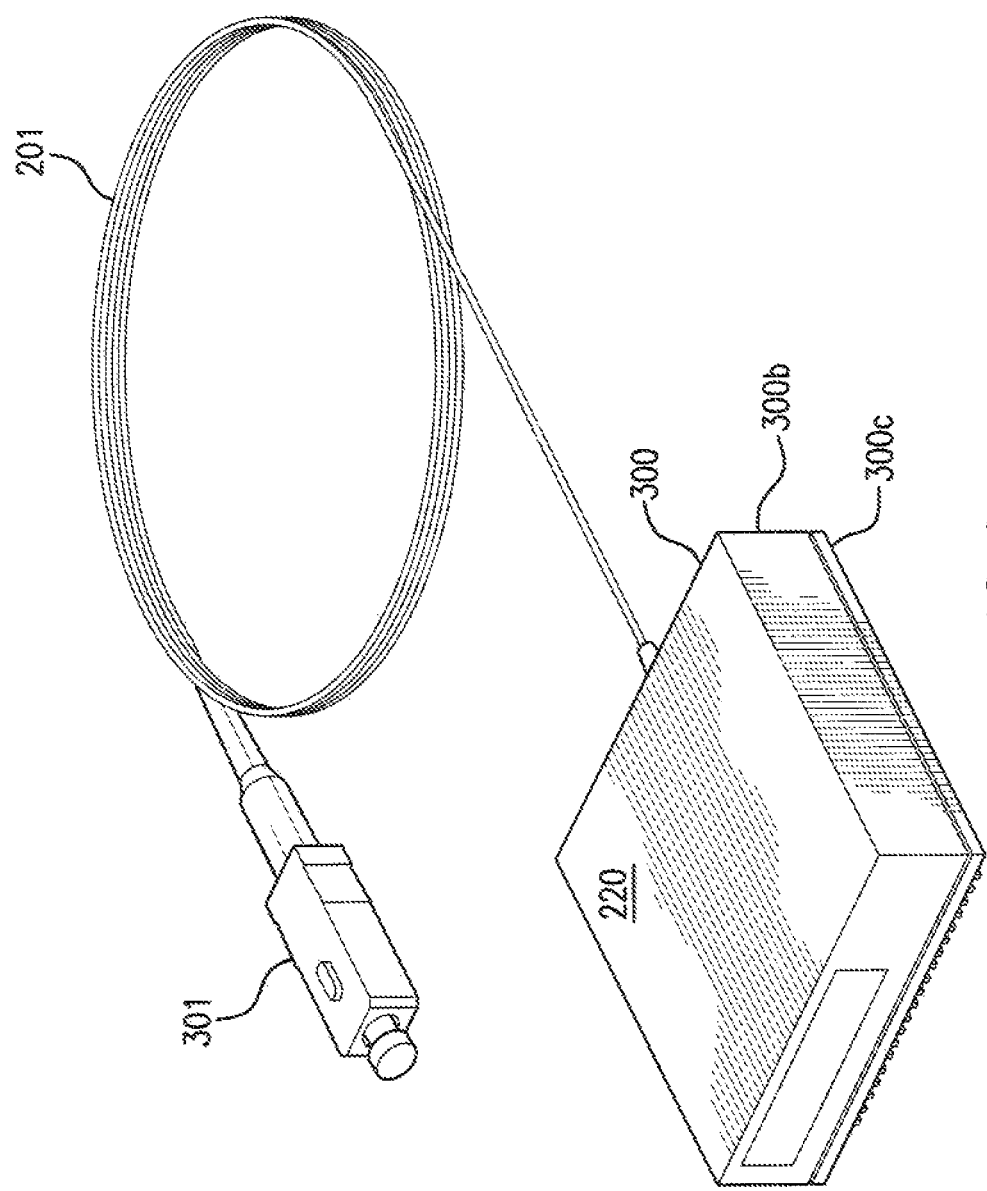
FIGS. 3-5 illustrate perspective views of an implementation of a transceiver module.

FIG. 3 illustrates an implementation of GPON module 220. The module 220 comprises a housing 300 that protects the internal components. The housing 300 can be made from a variety of materials (e.g., metals such as aluminum or steel). In some implementations, the material for the housing is chosen such that it offers some protection from electromagnetic interference (EMI). The housing 300, in this implementation, comprises a base (300*b*) and a cover (300*c*). The terms "base" and "cover" do not imply a required spatial orientation.

Optical cable 201 passes through the housing 300 and couples to a triplexer (202) disposed therein. At one end of the optical cable 201 is a coupler 301, which receives a second optical cable that is coupled to an optical splitter.

Figure 4:
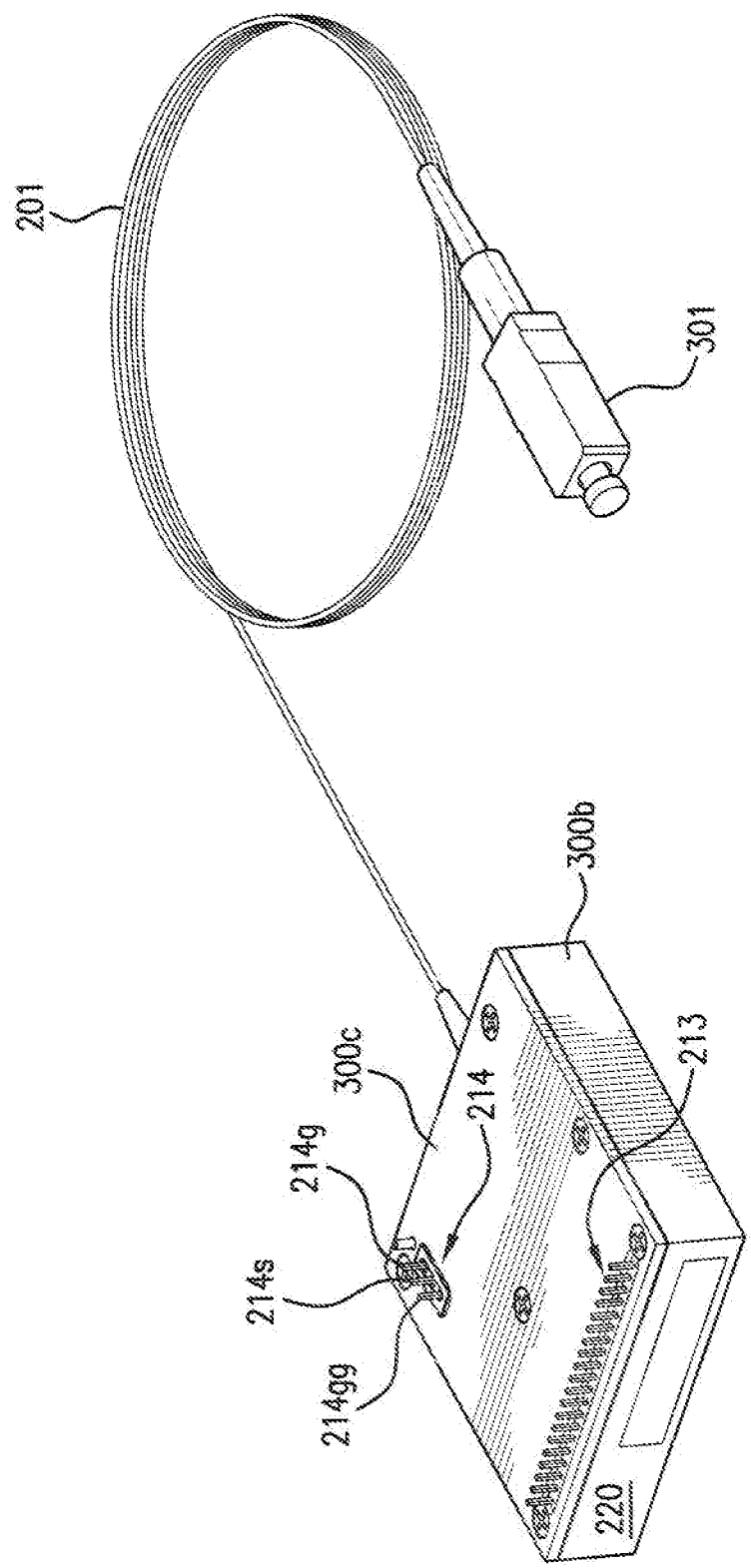
Figure 5:
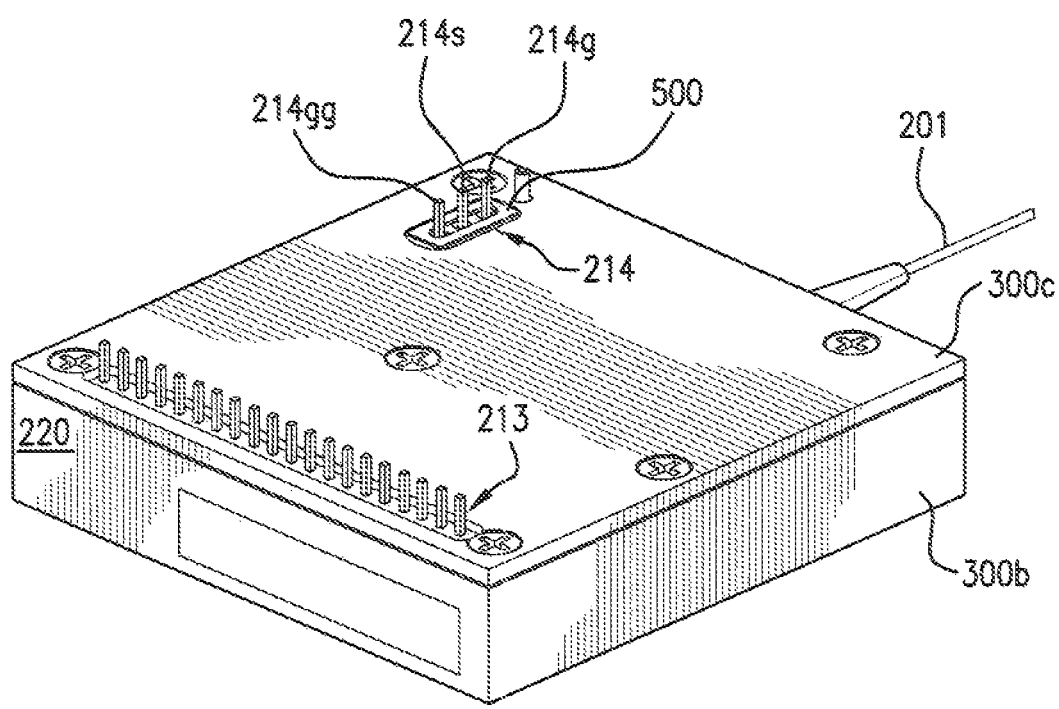

FIGS. 4 and 5 illustrate the cover 300c of GPON module 220. The cover 300c includes cutouts (see FIG. 8) that expose the RF interface 214 and the digital interface 213. When the module 220 is installed at a subscriber location, the cover 300c is coupled to and mounted against a subscriber-location circuit board that has mating connectors for the RF interface 214 and digital interface 213. In some prior modules, as discussed above, the RF interface consisted of a interface cable extending from the module. The three-pin RF interface 214 offers advantages over an interface cable such as: a more secure connection to the subscriber-location circuit (e.g., because there is no interface cable that is subject to flexing) and lower cost (e.g., because there no need for an expensive interface cable).

The digital interface 213 is a multi-pin connector that receives upstream data from the subscriber and provides downstream data from the service provider. For data/internet and voice (voIP), the digital interface 213 is coupled to twisted pair wiring installed at the subscriber's location. For downstream and upstream data associated with television service (e.g., when a customer orders "on demand" programming), the subscriber-location circuit board couples the digital interface to coaxial wiring installed at the subscriber's location.

The RF interface 214 is a three-pin connector and in some implementations includes an EMI pad 500. The center pin 214s carries the RF signal. The remaining two pins 214g and 214gg are ground connections. Providing two ground connections offers several advantages including improved signal quality (e.g., improved signal-to-noise ratio).

Figure 6:
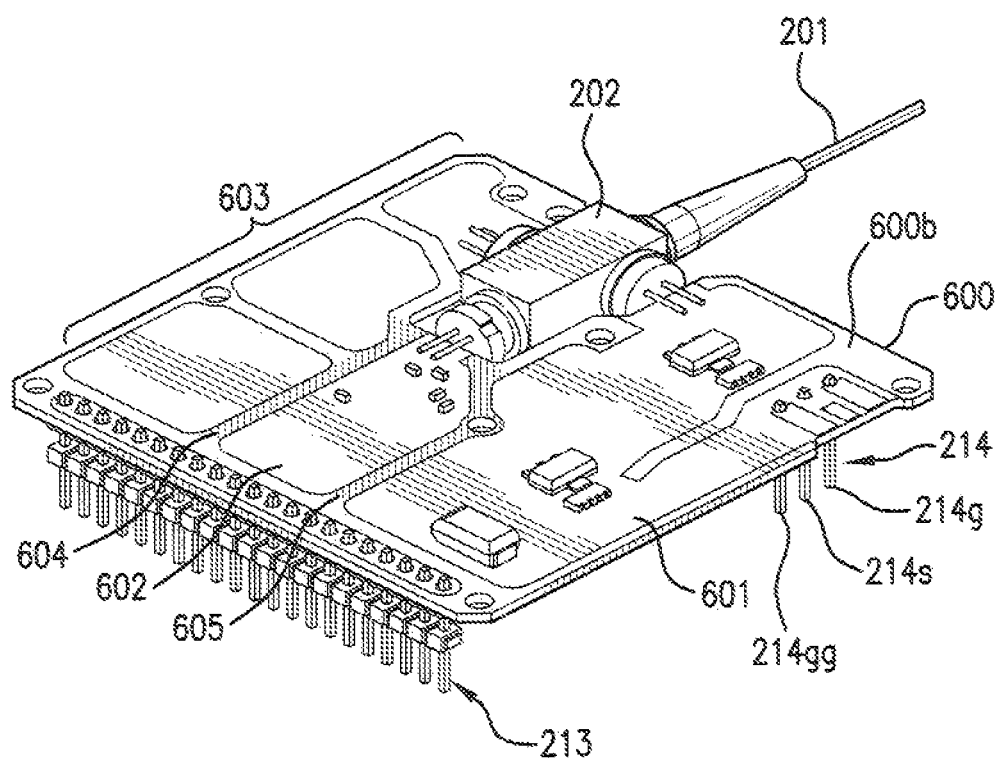
FIGS. 6 and 7 illustrate an implementation of a circuit board disposed in a transceiver module.

FIG. 6 illustrates a view of an implementation of a circuit board (PCB) 600 that is disposed inside the module 220. This view is of surface 600b, which, when the module is assembled, is in contact with at least part of the base 300b of the housing 300. Optical fiber 201 couples to the optical interface of the triplexer optical subassembly 202. The triplexer 202 offers three electrical interfaces, each coupled to a respective region of the circuit board 600. One electrical interface of the triplexer 202 is coupled to region 603 of the PCB 600, which is associated with the digital receiver 203. The second electrical interface of the triplexer is coupled to region 602 of the PCB 600, which is associated with the digital transmitter 204. The third electrical interface of the triplexer is coupled to region 601 of the PCB 600, which is associated with the analog video receiver 206. To improve signal separation between the upstream digital data (associated with region 603), downstream digital data (associated with region 602) and RF video signal (associated with region 601), relatively thick ground lines are laid on the PCB surface 600b to separate the circuitry. In this implementation, a ground line 604 (shown hatched) separates region 603 from region 602 and a ground line 605 (shown hatched) separates region 602 from region 601.

Figure 7:
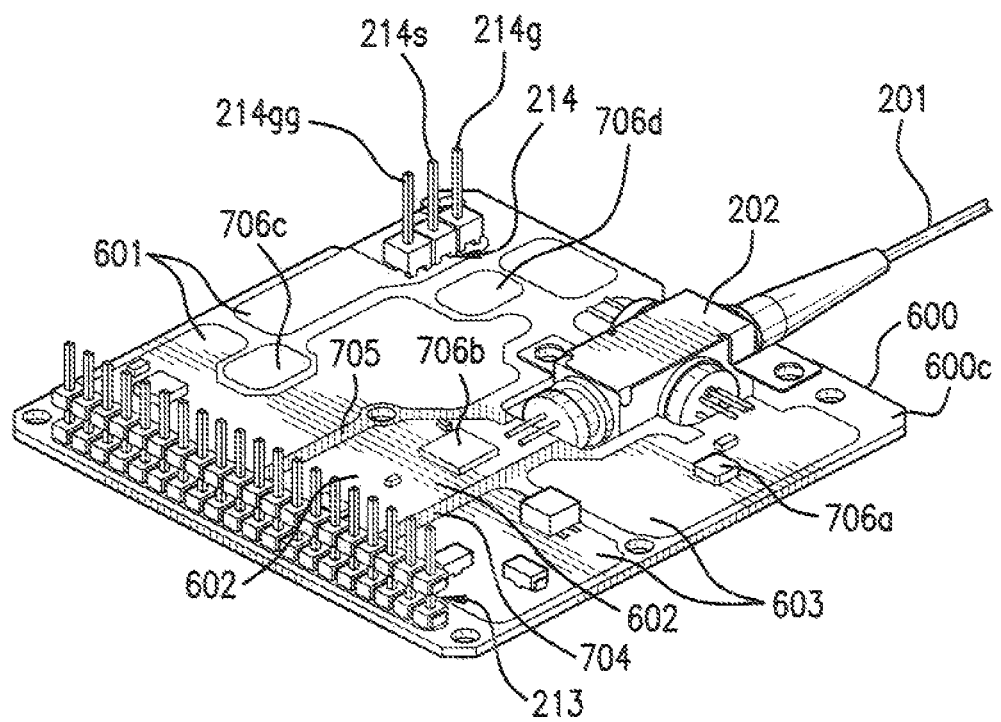

FIG. 7 illustrates a second view of an implementation of the PCB 600 that is disposed inside the module 220. This view is of surface 600c, which, when the module assembled, is in contact with at least part of the cover 300c of the housing 300. To improve signal separation between the upstream digital data (associated with region 603 of the PCB 600), downstream digital data (associated with region 602 of the PCB 600) and RF video signal (associated with region 601 of the PCB 600), relatively thick ground lines are laid on the PCB surface 600c to separate the circuitry. In this implementation, a ground line 704 (shown hatched) separates region 603 from region 602 and a ground line 705 (shown hatched) separates region 602 from region 601. Also visible from this perspective are several heat-generating components 706a-706d (e.g., active components such as ICs or passive components such as resistors). In this implementation, heat generating components 706c and 706d are heat conductive areas that substantially align with heat generating field effect transistors (FETs) disposed on the opposite side of the PCB (600b). Given the demand to miniaturize packaging, heat management of these components 706a-706d has become increasingly challenging. Accordingly, in some implementations of the housing 300, features are added that improve heat management. These features are discussed in additional detail in connection with FIG. 8.

Figure 8:
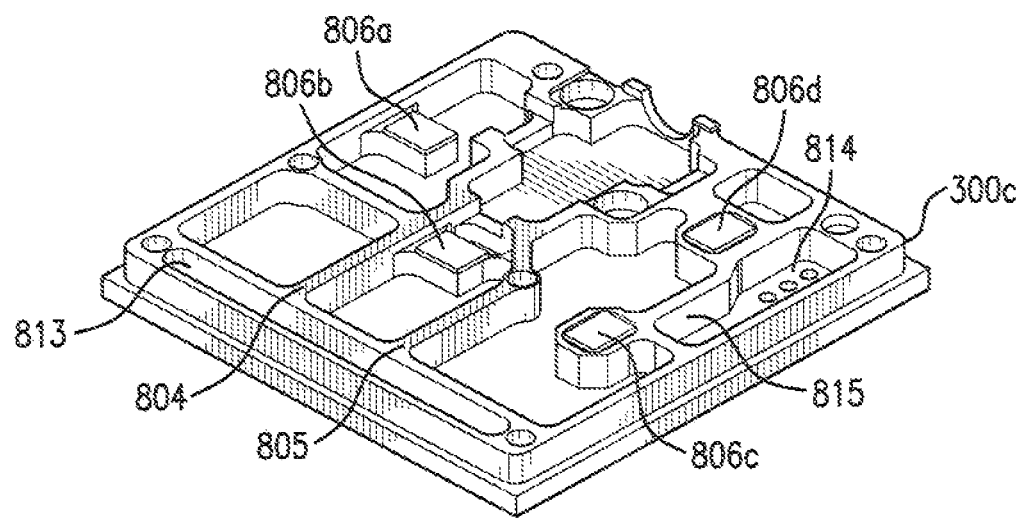
FIG. 8 is a perspective view of an implementation of the cover of the transceiver module housing.

FIG. 8 illustrates the underside of the cover 300c. The cover 300c comprises a first cutout 813 for exposing the digital interface 213 and a second cutout 814 for exposing the RF interface 214. The second cutout 814 also comprises relatively high isolating walls 815 that help prevent the RF signal (i.e., of pin 214s) from causing interference with other signals carried on the PCB 600, as well as other surrounding electronics. Also, for heat management, elevated platforms 806a-806d mate with heat-generating components 706a-706d, respectively. The elevated platforms contact the heat-generating components, and allow aspects of the housing 300 (particularly the cover 300c) to perform a heat-sinking function. The elevated platforms may comprise a highly heat conductive, yet electrically insulating material that contacts the heat-generating components. For example, heat sink compound (such as zinc oxide in a silicon base) can be applied to the elevated platforms. Also, each elevated platform can comprise a mica sheet that contacts its respective heat-generating component.

To improve signal separation between the upstream digital data (associated with region 603 of the PCB 600), downstream digital data (associated with region 602 of the PCB 600) and RF video signal (associated with region 601 of the PCB 600), relatively thick walls are formed in the cover 300c, which substantially correspond with and contact ground lines that are laid on the PCB surface 600c. In this implementation, wall 804 (shown hatched) substantially corresponds with and contacts ground line 704 of FIG. 7 and separates region 603 from region 602. Wall 805 (shown hatched) substantially corresponds with and contacts ground line 705 of FIG. 7 and separates region 602 from region 601. Walls 804 and 805 improve signal separation and signal-to-noise ratio.

Figure 9:
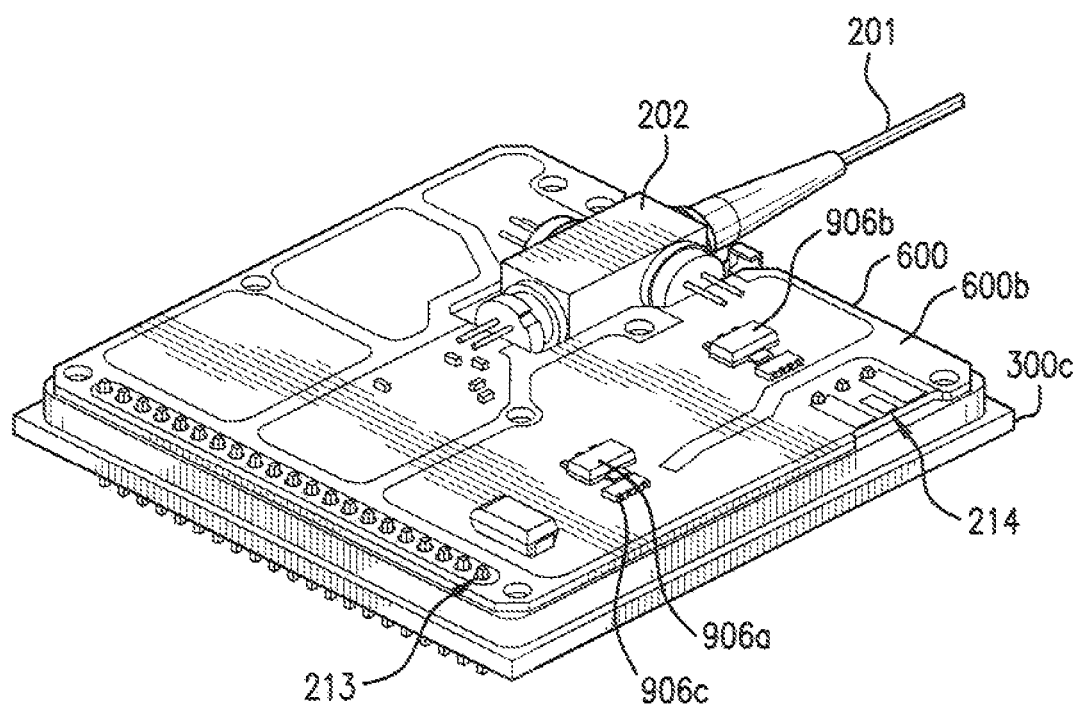
FIG. 9 is a perspective view of an implementation of the transceiver module housing and circuit board.

FIG. 9 illustrates the circuit board 600 mounted to the cover 300c. In this orientation, the pins of the digital interface 213 are exposed from the cutout 813, and the pins of RF interface 214 are exposed from cutout 814. Also visible from this perspective are several heat-generating components 906a-906c (e.g., active components such as ICs or passive components such as resistors) on surface 600b. Given the demand to miniaturize packaging, heat management of these components 906a-906c has become increasingly challenging. Accordingly, in some implementations of the housing 300, features are added that improve heat management. These features are discussed in additional detail in connection with FIG. 10.

Figure 10:
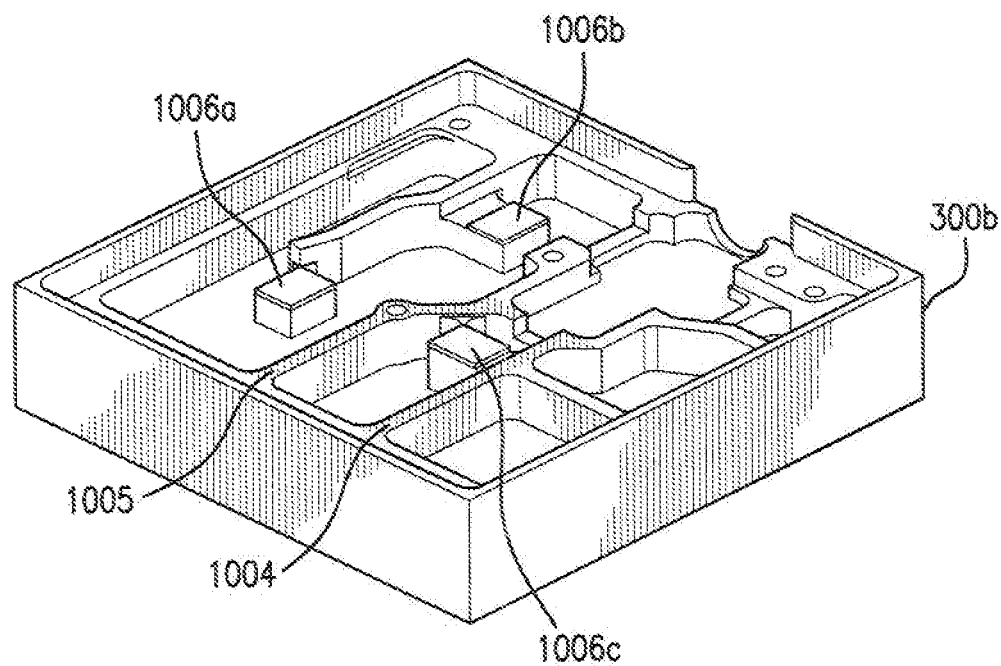
FIG. 10 is a perspective view of an implementation of the base of the transceiver module housing.

FIG. 10 illustrates the underside of the base 300b. For heat management, elevated platform 1006a mates with heat-generating components 906a and 906c and elevated platform 1006b mates with heat-generating component 906b. Elevated platform 1006c mates with a region of the PCB surface 600c that substantially aligns with where the heat-generating component 706b is mounted on surface 600b. The elevated platforms contact the heat-generating components, and allow aspects of the housing 300 (particularly the base 300b) to perform a heat-sinking function. The elevated platforms may comprise a highly heat conductive, yet electrically insulating material that contacts the heat-generating components. For example, heat sink compound (such as zinc oxide in a silicon base) can be applied to the elevated platforms. In some implementations, the elevated platforms comprise metal with a thermally conductive pad that electrically isolates a respective head-generating component. Also, each elevated platform can comprise a mica sheet that contacts its respective heat-generating component.

To improve signal separation between the upstream digital data (associated with region 603 of the PCB 600), downstream digital data (associated with region 602 of the PCB 600) and RF video signal (associated with region 601 of the PCB 600), relatively thick walls are formed in the base 300b, which substantially correspond with and contact ground lines that are laid on the PCB surface 600b. In this implementation, wall 1004 (shown hatched) substantially corresponds with and contacts ground line 604 of FIG. 6 and separates region 603 from region 602. Wall 1005 (shown hatched) substantially corresponds with and contacts ground line 605 of FIG. 6 and separates region 602 from region 601. Walls 1004 and 1005 improve signal separation and signal-to-noise ratio.

III. Linearity Optimization

The linearity performance of an amplifier (e.g., an FET amplifier implemented as part of analog video receiver 206 of FIG. 1) depends on temperature and input RF power, particularly at lower temperatures. For example, transistor amplifier parameters such as gain and $I_{DSS}$ (saturated drain current) depend on temperature. The outdoor environment commonly associated with FTTH technologies exposes ONUs (and any module disposed therein) to large temperature variation and the nature of a passive network presents large dynamic RF input range. An ONU typically operates in and around the temperature range of −40° C. to 85° C. The video receiver amplifier linearity is challenged, especially near −40° C. Maintaining amplifier linearity in an ONU can be accomplished with a temperature compensation circuit around the amplifier of the analog video receiver. While a thermistor may be used in the compensation circuit to adjust DC bias or gain, such circuits are limited in their flexibility and ability to provide correction.

A temperature compensated DC bias circuit and/or pre-distortion circuit can improve the linearity. Pre-distortion is one technique for improving amplifier linearity. The amount of pre-distortion can be controlled by the DC bias to the pre-distortion circuit. A pre-distortion signal that is approximately equal to the inverse of the expected temperature-dependent distortion is added to the signal before amplification. To improve the amplifier linearity at certain temperatures, the amount of pre-distortion or DC bias may need to be controlled.

In some available modules, microprocessors and temperature sensors are present for $I^2C$ (i.e., the "Inter-Integrated Circuit" bus standard promulgated by NXP B.V.) communication and laser operation. As such, the digital control 205 and look up table 211 of FIG. 2 can be implemented by hardware that also performs the functions of another block, e.g., the digital control 205. The temperature sensor 212 also can be implemented by hardware that is associated with another block. In some implementations, the temperature sensor is disposed near the digital control 205. Therefore, it is possible—with software and pre-calibrated temperature-compensated data table—to tune amplifier DC bias and/or its pre-distortion circuit controls to maintain linearity over temperature at low cost. At intervals, a microprocessor (e.g., a microcontroller) such as item 205 of FIG. 2 reads temperature information from temperature sensor (e.g., item 212 of FIG. 2) and RF input power indicated by photo diode current (from, e.g., analog video receiver 206) and updates the DC bias of amplifiers and/or pre-distortion circuit controls. A look-up table (e.g., item 211 of FIG. 2) stored in a memory associated with the microcontroller is accessed during calibration and contains the optimum DC bias and pre-distortion circuit controls at certain temperature points. The real values are calculated (e.g., interpolated) from these data points.

Figure 11:
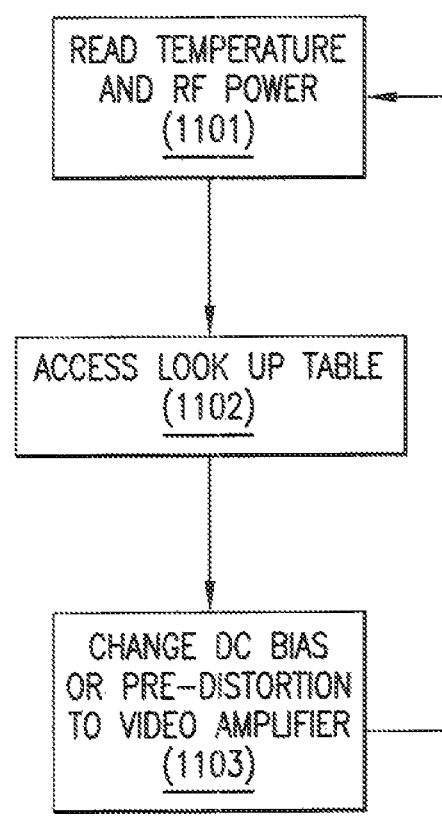
FIG. 11 is a block diagram of an implementation of enhancing video amplifier linearity.

FIG. 11 illustrates an implementation of a method wherein linearity over temperature of an amplifier is optimized using a compensation circuit (e.g., a DC bias circuit or pre-distortion circuit) controlled by an intelligent digital circuit (such as a microcontroller or digital potentiometer.) This method can be implemented by adding a new piece of software to an existing microcontroller and DAC (Digital-to-Analog Conxerter) or PWM (Pulse Width Modulation) circuit. The microcontroller causes the temperature and incoming RF power to be determined (1101). The microcontroller then accesses a look up table (1102) to determine the appropriate amount of DC bias or pre-distortion based on the based on the temperature and incoming RF power. The microcontroller, which is coupled to the video amplifier, changes the DC bias and/or pre-distortion in accordance with the look up table (1103). In some implementations, the blocks of FIG. 11 are repeated to ensure that the linearity of the video amplifier is optimized. Blocks 1101 through 1103 can be repeated in pre-determined intervals (e.g., every minute), or the frequency of repetition can vary with a pre-specified parameter (e.g., lower temperature and/or lower incoming RF power results in more frequent repetition).

Figure 12:
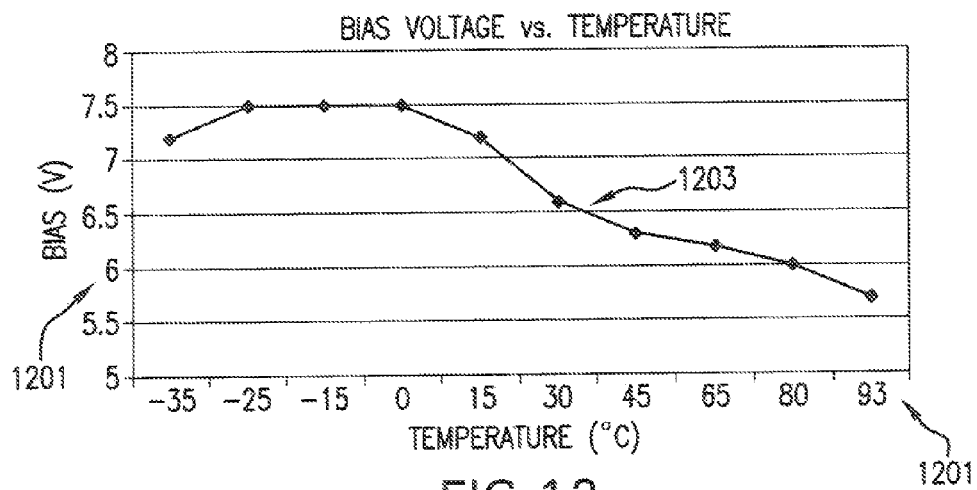
FIGS. 12 and 13 illustrate examples of curves that can be implemented as look up tables.
Figure 13:
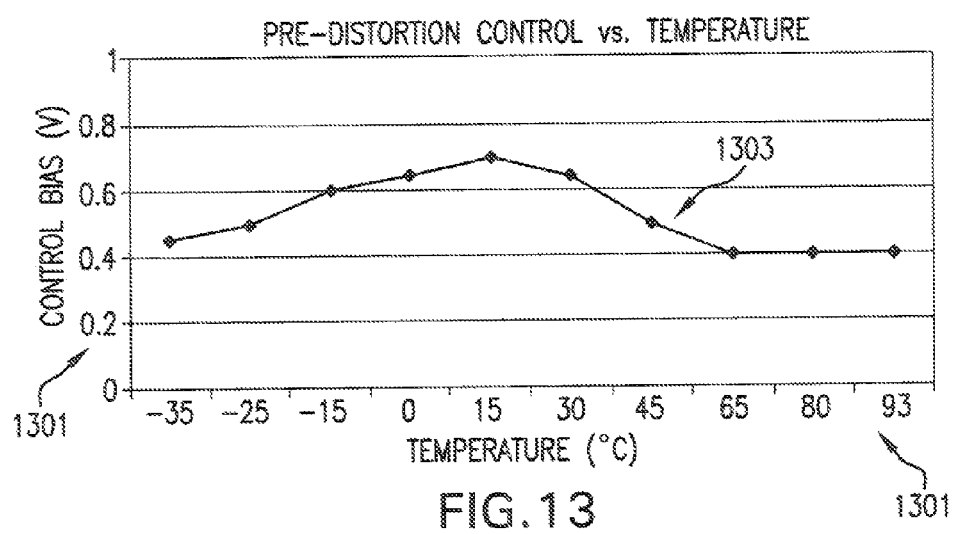

FIG. 12 illustrates a curve that can be implemented as a DC bias look up table as a function of temperature. For a given temperature along the X-axis (1201), line 1203 indicates a corresponding DC bias voltage on the Y-axis (1201). FIG. 13 illustrates a curve that can be implemented as a pre-distortion control bias look up table as a function of temperature. For a given temperature along the X-axis (1301), line 1303 indicates a corresponding pre-distortion control bias voltage on the Y-axis (1301). The data of the look up tables of FIGS. 12 and 13 can be stored in the look up table memory 211 of FIG. 2. In some implementations, one or both of the DC bias and pre-distortion control linearization methods are used. Accordingly, the data needed for the particular linearization implemented should be stored in look up table memory 211. Although in some cases the look up table 211 stores only particular data points of temperature versus DC bias or pre-distortion control, the microcontroller (e.g., item 205) is capable of interpolating between data points to approximate the appropriate value for a given temperature. The look up table can be calibrated with prototypes by maximizing the amplifier linearity over temperature, especially at low temperature.

Figure 14:
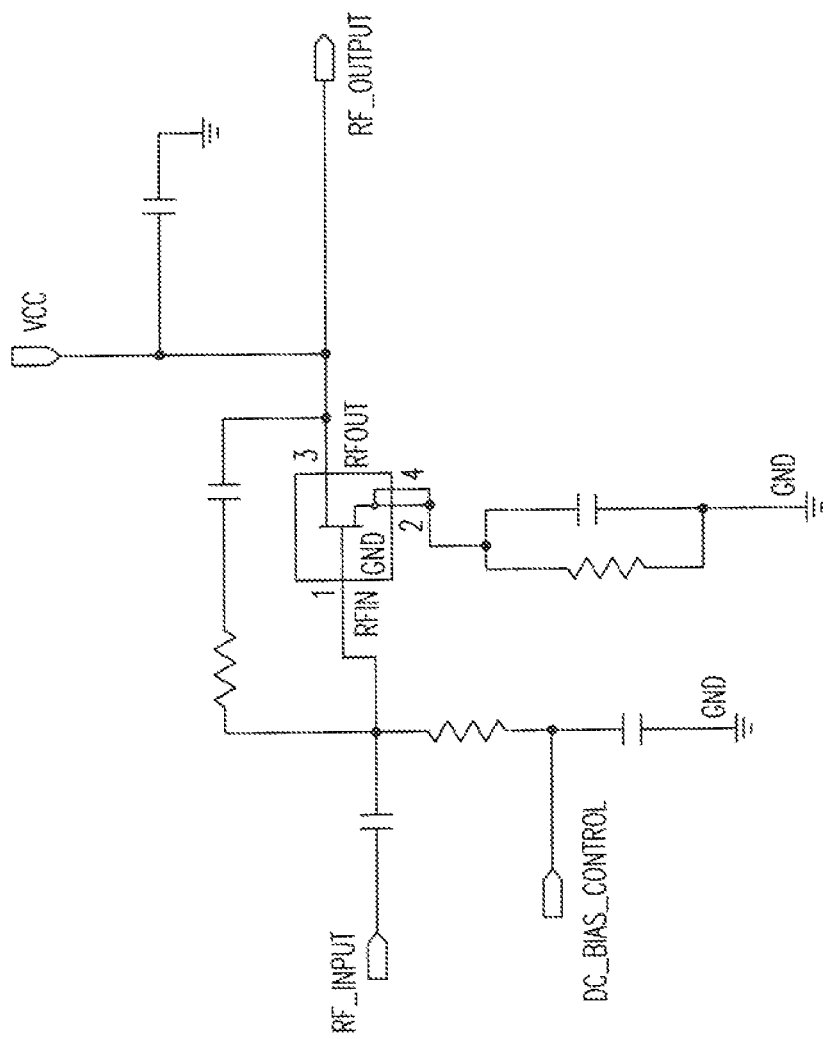
FIG. 14 illustrates an example of a circuit for DC current bias control circuit of an FET amplifier.
Figure 15:
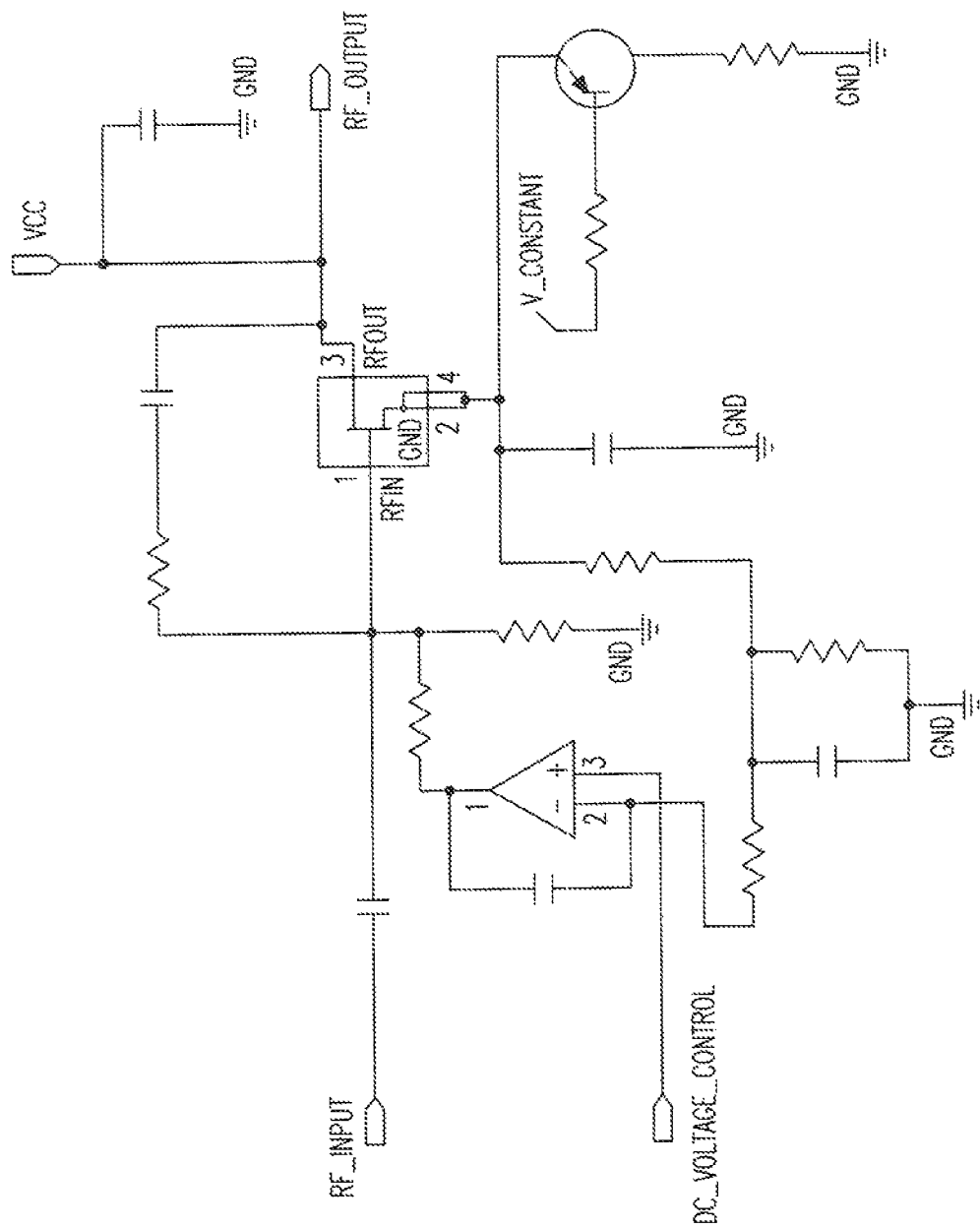
FIG. 15 illustrates an example of a circuit for DC voltage bias control circuit of an FET amplifier.

FIG. 14 illustrates an example of a circuit for DC current bias control circuit of FET amplifier. FIG. 15 illustrates an example of a circuit for DC voltage bias control circuit of FET amplifier. The input signal to "DC_BIAS_CONTROL" is set by the microcontroller based on the value from the look up table illustrated in FIG. 12.

Figure 16:
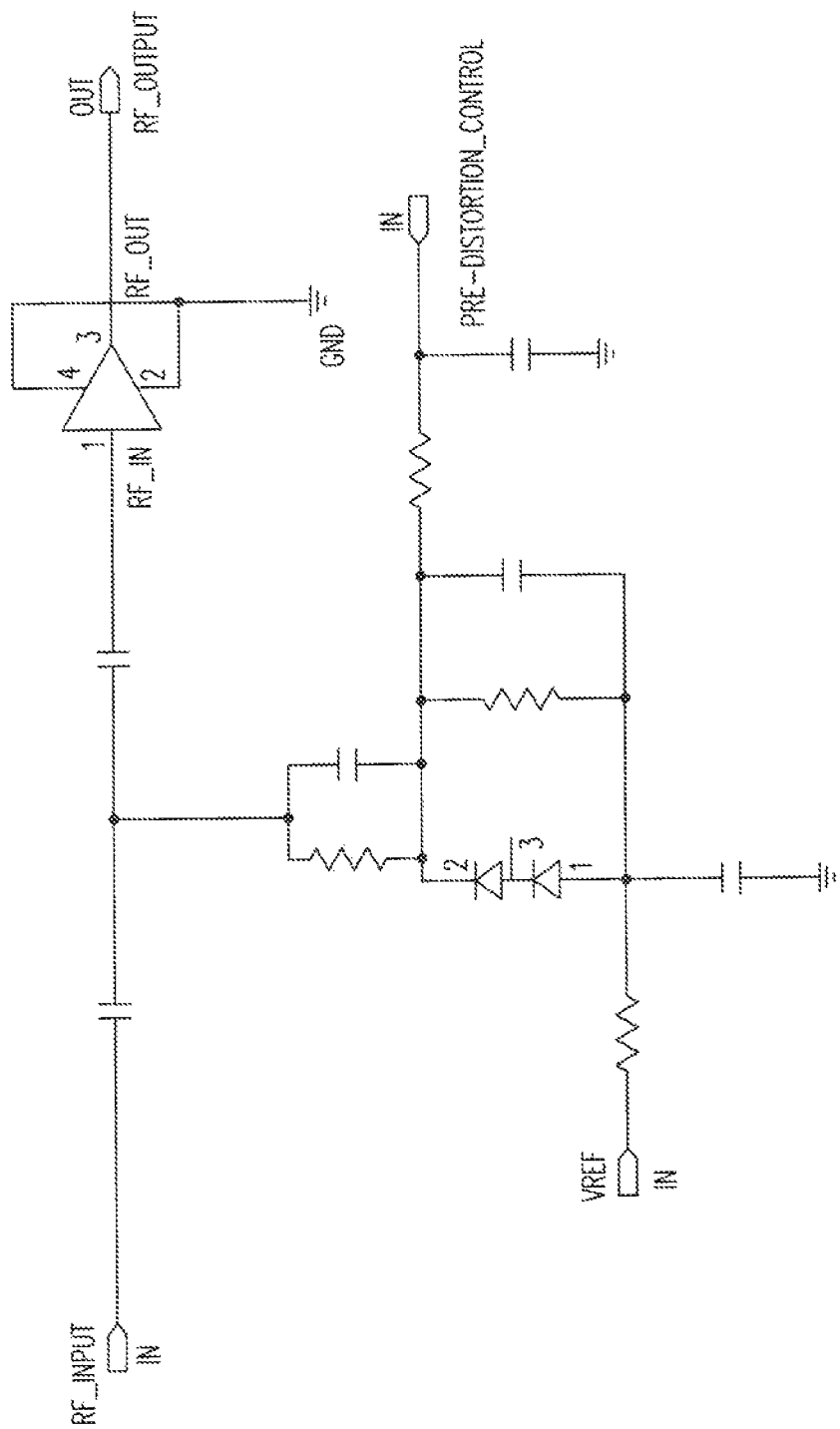
FIG. 16 illustrates an example of a circuit for pre-distortion control.

FIG. 16 illustrates an example of a circuit for pre-distortion control. The input signal to "PRE-DISTORTION_CONTROL" is set by the microcontroller based on the value from the look up table illustrated in FIG. 13.

A number of implementations have been described. Nevertheless, it will be understood that various modifications may be made without departing from the spirit and scope of the invention. Accordingly, other embodiments are within the scope of the following claims.

What is claimed is:

1. A transceiver module for use in a passive optical network, the passive optical network comprising an optical line termination unit coupled to a service provider for providing downstream data and receiving upstream data in an optical format to and from subscribers; a passive optical splitter coupled to the optical line termination unit and disposed at a location remote therefrom, the passive optical splitter adapted to divide the downstream data into multiple, substantially identical downstream optical signals and further adapted to receive multiple upstream optical signals; and a plurality of transceiver modules, each associated a with a respective subscriber and adapted to receive a downstream optical signal and transmit an upstream optical signal, each transceiver module comprising:
   a housing comprising a base and a cover;
   a circuit board disposed in the housing, the circuit board comprising a triplexer optical sub-assembly, a digital transmitter, an analog receiver, a digital receiver, and a digital controller coupled to said digital transmitter, analog receiver and digital receiver, wherein the triplexer optical sub-assembly is coupled to an optical fiber to receive the downstream optical signal and convert it into a first electrical signal and a second electrical signal,
   wherein the analog receiver includes an amplifier and the digital controller is configured to control the amplifier to tune DC bias or a pre-distortion circuit to maintain linearity and to provide an electrical RF signal from the first electrical signal to an RF interface,
   wherein the digital controller is further configured to control the digital receiver to receive the second electrical signal and provide a digital signal according to one or more protocols to a digital interface, under the control of the digital controller,
   wherein the digital controller is further configured to control the digital transmitter to receive a digital signal from the digital interface and convert the digital signal to a format appropriate for inputting to the triplexer optical sub-assembly,
   wherein the RF interface comprises a three-pin RF connector exposed from the housing, and wherein the RF connector is coupled directly to the circuit board and two of the three pins are coupled to ground, wherein the RF connector is configured to couple to and mount against a second circuit board without any interface cable.

2. The transceiver module of claim 1 wherein the digital receiver is arranged to receive the second electrical signal and provide a data signal to a data interface, the data interface comprising a multi-pin connector exposed from the housing.

3. The transceiver module of claim 2 wherein the triplexer optical sub-assembly comprises:
   an outbound converter to receive outbound electrical data from the outbound data processing circuitry and convert the outbound electrical data into an outbound optical signal for transmittal on the optical fiber, wherein the outbound data processing circuitry is coupled to the data interface.

4. The transceiver module of claim 3 wherein the digital controller is further configured to control the digital receiver and the outbound data processing circuitry such that upstream and downstream data is transmitted and received, respectively, substantially in compliance with ITU-T G.984.

5. The transceiver module of claim 1 wherein the circuit board further comprises ground lines that substantially isolate electrically the analog receiver, the digital receiver, and the outbound data processing circuitry from each other.

6. The transceiver module of claim 1 wherein the cover comprises a cutout for exposing the RF interface, the cutout comprising isolating walls that substantially surround the RF interface.

7. The transceiver module of claim 5 wherein the base comprises isolating walls that substantially correspond with and contact at least a portion of the ground lines.

8. The transceiver module of claim 5 wherein the cover comprises isolating walls that substantially correspond with and contact at least a portion of the ground lines.

9. The transceiver module of claim 1 wherein the analog receiver comprises: means for generating a distorted first electrical signal by applying a distortion signal to the first electrical signal;
   an amplifier to amplify the distorted first electrical signal; and
   a temperature detector to generate a temperature signal representative of the temperature in proximity to the first processing circuitry;
   means for adjusting the distortion signal in response to the temperature signal to maintain substantial linearity of the amplifier with temperature.

10. The transceiver module of claim 1 wherein the downstream data is transmitted at about 2,488 MBits/second.

11. A transceiver module comprising:
    a housing comprising a base and a cover; a circuit board disposed in the housing, the circuit board comprising an electro-optical interface, an analog receiver, a digital receiver, and outbound data processing circuitry, the circuit board further comprising ground lines that substantially isolate electrically the analog receiver, the digital receiver, and the outbound data processing circuitry from each other;
    wherein the electro-optical interface comprises:
    an optical receiver for coupling to an optical fiber and for receiving a multiplexed optical signal;
    an optical demultiplexer coupled to the optical receiver for demultiplexing the multiplexed optical signal into signals comprising first and second optical signals;
    a first converter to convert the first optical signal into a first electrical signal; and
    a second converter to convert the second optical signal into a second electrical signal;
    wherein the analog receiver includes an amplifier and the digital controller is configured to control the amplifier to tune DC bias or a pre-distortion circuit to maintain linearity and to provide an electrical RF signal to an RF interface, the RF interface comprising a three-pin RF connector exposed from the housing, wherein the RF connector is configured to couple to and mount against a second circuit board without any interface cable.

12. The transceiver module of claim 11 wherein the RF connector is coupled to a first surface of the circuit board, and a second surface of the circuit board is in contact with the base.

13. The transceiver module of claim 12 wherein the base comprises isolating walls that substantially contact and align with at least a portion of two of ground lines of the circuit board.

14. The transceiver module of claim 12 wherein at least a portion of the first surface of the circuit board is in contact with the cover.

15. The transceiver module of claim 14 wherein the cover comprises isolating walls that substantially contact and align with at least a portion of two of the ground lines of the circuit board.

16. The transceiver module of claim 14 wherein the cover comprises an isolating wall that surrounds the RF connector.

17. The transceiver module of claim 11 wherein the transceiver module is coupled to a gigabit passive optical network substantially compliant with ITU-T G.984.

18. The transceiver module of claim 11 wherein the analog receiver comprises:
an amplifier to amplify the first electrical signal;
a temperature detector to generate a temperature signal representative of the temperature in proximity to the first processing circuitry; and
a microprocessor coupled to the amplifier and temperature detector to adjust the DC bias of the amplifier in response to the temperature signal to maintain substantial linearity of the amplifier with temperature.

19. The transceiver module of claim 18 wherein the microprocessor comprises:
a memory structure comprising a look-up table, the look-up table comprising:
a plurality of temperature parameters each associated with a respective temperature; and
a plurality of bias parameters each associated with a DC bias value for each respective temperature parameter.

20. The transceiver module of claim 11 wherein the analog receiver comprises:
a pre-distortion circuit to generate a distorted first electrical signal by applying a distortion signal to the first electrical signal;
an amplifier coupled to the pre-distortion circuit to amplify the distorted first electrical signal;
a temperature detector to generate a temperature signal representative of the temperature in proximity to the first processing circuitry; and
a microprocessor coupled to the pre-distortion circuit and temperature detector to adjust the distortion signal in response to the temperature signal to maintain substantial linearity of the amplifier with temperature.

21. The transceiver module of claim 20 wherein the microprocessor comprises:
a memory structure comprising a look-up table, the look-up table comprising:
a plurality of temperature parameters each associated with a respective temperature; and
a plurality of distortion parameters each associated with a distortion signal for each respective temperature parameter.

22. The transceiver module of claim 11 wherein the electro-optical interface comprises:
an outbound converter to receive outbound electrical data from the outbound data processing circuitry and convert the outbound electrical data into an outbound optical signal for transmittal on the optical fiber.

23. The transceiver module of claim 11 wherein the digital receiver is arranged to receive the second electrical signal and provide a data signal to a data interface, the data interface comprising a multi-pin connector exposed from the housing.

24. The transceiver module of claim 14 wherein the cover comprises a window for exposing the RF connector.

25. The transceiver module of claim 12, wherein the second surface of the circuit board comprises heat-generating components, and the base comprises one or more elevated portions to contact a respective heat-generating component, thereby causing at least a portion of the housing to perform a heat sinking function.

26. The transceiver module of claim 14, wherein the first surface of the circuit board comprises heat-generating components, and the cover comprises one or more elevated portions to contact a respective heat-generating component, thereby causing at least a portion of the housing to perform a heat sinking function.

* * * * *